(12) United States Patent
Furuichi et al.

(10) Patent No.: US 8,683,199 B2
(45) Date of Patent: Mar. 25, 2014

(54) SYSTEM, METHOD AND PROGRAM FOR PROTECTING INFORMATION ON COMPUTER SCREEN

(75) Inventors: Sanehiro Furuichi, Tokyo (JP); Masana Murase, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 1018 days.

(21) Appl. No.: 12/175,841

(22) Filed: Jul. 18, 2008

(65) Prior Publication Data

US 2009/0064312 A1 Mar. 5, 2009

(30) Foreign Application Priority Data

Aug. 30, 2007 (JP) ................................ 2007-223850

(51) Int. Cl.
G06F 21/00 (2013.01)
G06F 21/84 (2013.01)
G06F 21/71 (2013.01)
G06F 21/60 (2013.01)

(52) U.S. Cl.
CPC ............... *G06F 21/84* (2013.01); *G06F 21/71* (2013.01); *G06F 21/60* (2013.01)
USPC ................................ 713/167; 726/26; 726/27

(58) Field of Classification Search
USPC ................................ 713/165, 167; 726/26–27
See application file for complete search history.

(56) References Cited

U.S. PATENT DOCUMENTS

| 6,954,532 B1 * | 10/2005 | Handley et al. | 380/54 |
| 2003/0028497 A1 * | 2/2003 | Leon | 705/408 |
| 2007/0043673 A1 * | 2/2007 | Hirano | 705/51 |

FOREIGN PATENT DOCUMENTS

| JP | 11249965 | | 2/1998 |
| JP | 11249965 A | * | 9/1999 |
| JP | 2001062571 | | 9/2002 |
| JP | 2007034685 | | 7/2005 |
| JP | 2007052655 | | 1/2007 |
| JP | 2007052855 | | 1/2007 |
| JP | 2007065846 | | 3/2007 |
| JP | 2007065849 | | 3/2007 |

* cited by examiner

*Primary Examiner* — Benjamin Lanier
(74) *Attorney, Agent, or Firm* — Suiter Swantz pc llo

(57) ABSTRACT

Whenever a drawing command is executed, a computer system having a graphic user interface such as a multi-window system determines, from the logical operation pattern of the drawing command, what kind of information is inherited by a drawing result from the drawing command, preferably without performing a complicated step such as an image process. At the same time, the computer system controls information flow of an image outputted to a screen by managing labeled area maps which correspond one to one to images on the screen and in a memory.

16 Claims, 9 Drawing Sheets

SYSTEM, METHOD AND PROGRAM FOR PROTECTING INFORMATION ON COMPUTER SCREEN

CROSS-REFERENCE TO RELATED APPLICATIONS

The present application claims the benefit under 35 U.S.C. §119 of Japan; Application Serial Number 2007-223850, filed Aug. 30, 2007 entitled "SYSTEM, METHOD AND PROGRAM FOR PROTECTING INFORMATION ON COMPUTER SCREEN," which is incorporated herein by reference;

TECHNICAL FIELD

The present invention generally relates to security management of a computer, and more particularly relates to a technology for protecting displayed information on a screen connected to a computer.

BACKGROUND

In recent years, the necessity for carefully controlling access to computer resources has been increasing in order to enhance compliance and protect personal information. Hence, various methods have been put into practical use to control accesses to a file including confidential information and to control a flow of confidential information transmitted via clipboards or interprocess communications.

However, the security of information on a screen, which is a final output device of information, cannot be effectively managed by simply controlling access rights to a file and information on a clipboard.

More precisely, even if an access right to a file itself including confidential information is set, an absence of a secure method for protecting image data outputted to a screen allows the data, including the confidential information on the screen to be freely read from any process.

Screen information of a certain guest operating system (OS) can be isolated from another guest OS by use of a computer virtualization technology such as VMWare or Virtual PC. However, this technology allows a host OS to freely read the screen of a guest OS. For this reason, if malicious software hides in the host OS, it is not possible to perfectly avoid a risk of maliciously taking out confidential information on the screen of the guest OS.

Moreover, in a secured X Window System of the National Security Agency (NSA), confidential information is allowed to be displayed on an independent virtual desktop screen isolated from another desktop screen on which other processes run. However, image data in a video memory is not protected by this technology, and this allows a background process to freely read the image information.

Japanese Patent Application Laid-open Publication No. Hei 11-249965 discloses a computer system which performs a process for display on a display screen of a display device in accordance with video data stored in a video memory. The computer system is provided with a window management table for managing, window by window, screen information displayed on the display screen. In response to a display instruction for the screen information of a certain window, the window management table is updated, and copy protection information is concurrently set in the window management table. The copy protection information is for instructing protection of the screen information from a copy process. Thus, upon receipt of a copy request for the screen information of a certain window displayed on the display screen through the display process, the computer system refers to the window management table. If the copy protection information is set for the screen information targeted by the copy request, the computer system prohibits the video data corresponding to the screen information from being copied from the video memory.

Japanese Patent Application Laid-open Publication No. 2007-34685 discloses a system for implementing security protection of each content displayed on an electronic paper, and other accompanying functions. The system includes use restriction storage means. The use restriction storage means holds use restriction information of each content, and display control means writes the display content of the content to a display unit in a form in accordance with the use restriction information. Then, according to the use restriction information, the system displays or does not display certain content in a document displayed on the display unit, or performs another equivalent process. Thus, by restricting use of contents, the system attains the security protection of the contents, the maintaining of the sameness thereof, or the like. Furthermore, in response to a confirmation request from a user, the use restriction information held in the use restriction storage means is written to the display unit, and is presented to the user.

Japanese Patent Application Laid-open Publication No. 2007-52655 discloses a document display control apparatus. The document display control apparatus includes: means for obtaining authentication information which is associated with a user who has access to a predetermined area; means for determining whether or not the obtained authentication information meets a display permission condition which is associated with a document to be displayed; and restriction means for restricting display of the document on a display unit when the authentication information does not meet the display permission condition.

Japanese Patent Application Laid-open Publication No. 2007-65846 is assigned to the same applicant as this application, and discloses an information handling system which operates a plurality of application programs including first and second application programs in parallel on an operating system. The information handling system includes a monitor and a controller. The monitor monitors a function call from the first application program to the operating system, or messages transmitted/received between the first application program and the operating system. According to the monitoring result by the monitor, the controller changes or prohibits processing for a function call from the second application program to the operating system, or processing for transmitting/receiving messages between the second application program and the operating system. This information handling system is shown as one of background arts of the present invention for reference.

These conventional technologies make achievements in effectively protecting the security of a screen for specific purposes. However, these conventional technologies fail to appropriately deal with a translucent window, which is increasingly adopted in a GUI environment, and also has difficulty to implement flexible security management in accordance with character string information, a font size and the like, which are used for display.

SUMMARY OF THE INVENTION

The present invention has been made to solve the above problems, and an objective of the present invention is to provide a technology capable of implementing flexible and effective security management of display information, in consideration of the attribute of a window to be displayed and a drawing result.

The above objective is achieved in a computer system having a graphic user interface such as a multi-window system as follows. Whenever a drawing command is executed, the computer system determines, from the logical operation pattern of the drawing command, what kind of information is inherited by a drawing result from the drawing command, preferably without performing a complicated step such as an image process. Simultaneously, the computer system controls information flow of an image outputted to a screen by managing labeled area maps which correspond to images on a screen and in a memory one-to-one.

The present invention is configured of: a drawing command execution detector for detecting the execution of a drawing command of each process for a graphics device; a drawing command analyzer for determining an image status after the execution of the drawing command detected by the drawing command execution detector, by analyzing the type and the parameter of the drawing command; a label allocator for labeling a drawing area based on the determination result of the drawing command analyzer; a label map manager for managing labels of a screen and an off-screen buffer; a drawing command executor for actually executing the drawing command; and an image process controller for processing an image of a reading source in accordance with a label of the reading source area when the drawing command execution detector detects the image reading from the screen or the off-screen buffer.

According to the present invention, a monitoring module is first made to be resident in each process. Then, the monitoring module monitors a drawing command of the process for a graphics device.

The monitoring module allocates a security label to a drawing area in accordance with the attribute of a drawing process and the type of the drawing command, when the process writes image data. The drawing area includes an unviewable area on an off-screen buffer other than a viewable area on a screen. The present invention analyzes the type and the parameter of drawing command, determines what image information is to be left after executing the drawing command as a result of the logical operation on an existing image (Destination) in the drawing area, an image (Source) targeted for the process of the logical operation, and an image element (Pattern) designated by the parameter. In accordance with the result, the present invention allocates a security label.

On the other hand, when the process reads the image data on the screen or the off-screen buffer, the monitoring module compares the security label of the process with the security label of a screen area to be read, and makes an allowed/denied determination on a read command. When the security label of the screen area is higher than the security label of the reading process, the read command is caused to fail, or black-filled or mask-processed image data is returned in order that image information in the area is not conveyed to a process with a lower security label.

With the present invention, confidential information outputted onto a screen can be read only by processes to which appropriate security labels are allocated. Consequently, malicious programs and general programs cannot obtain a confidential information image on the screen. As a result, it is possible to avoid the risk of leaking the confidential information by a screen snapshot being obtained.

BRIEF DESCRIPTION OF THE DRAWINGS

For a more complete understanding of the present invention and the advantage thereof, reference is now made to the following description taken in conjunction with the accompanying drawings.

DETAILED DESCRIPTION OF THE PREFERRED EMBODIMENT

With reference to drawings, descriptions will hereinafter be given of the configuration and the processing of an embodiment of the present invention. In the following descriptions through the drawings, unless otherwise stated particularly, the same symbols are used to refer to the same elements. The configuration and processing to be described herein is described as one of embodiments, and it should be understood that it is not intended to interpret the technical scope of the present invention by limiting to this embodiment.

Figure 1:
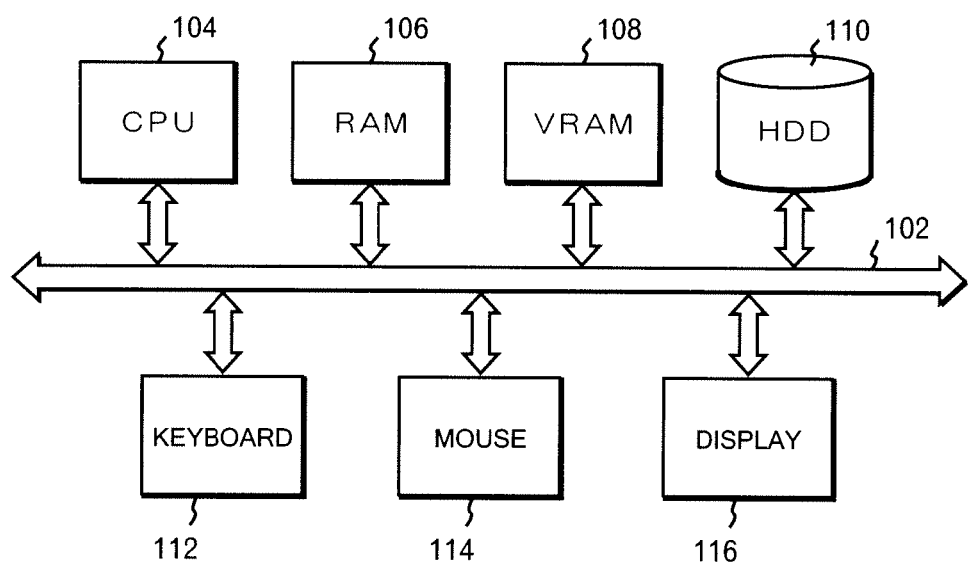
FIG. 1 is a block diagram of computer hardware for embodying the present invention.

FIG. 1 shows a block diagram of computer hardware for realizing a system configuration and processing according to the embodiment of the present invention. In FIG. 1, a CPU 104, a main memory (a RAM) 106, a video memory (a VRAM) 108, a hard disk drive (HDD) 110, a keyboard 112, a mouse 114 and a display 116 are connected to a system path 102. The CPU 104 is preferably based on the architecture of 32 or 64 bits. For example, Pentium (trademark) 4 of Intel Corporation, Athlon (trademark) of Advanced Micro Devices, Inc., or the like can be used for the CPU 104. The main memory 106 preferably has a capacity of 512 KB or more. The video memory 108 is used for holding an image to be outputted to the display 116.

The hard disk drive 110 stores an operating system and a processing program according to the present invention, and an application program thereof such as a word processor, a spreadsheet program, a presentation creation program, and a database program, although they are not illustrated individually. The operating system may be an arbitrary one which supports a multi-window graphic user interface and is applicable to the CPU 104. The operating systems such as Linux (trademark), Windows XP (trademark) and Windows (trademark) 2000 of Microsoft Corporation, and Mac OS (trademark) of Apple Inc. may be used. Note that for convenience, descriptions will hereinafter be given while using Windows XP (trademark) as an operating system and Win 32 API as an API. However, those skilled in the art will understand that other operating systems such as Linux (trademark) have a similar API.

A security management program according to the present invention, which will be described later, is also stored in the hard disk drive 110. The security management program is written in an arbitrary program language processing system such as C, C++, C#, and Java (trademark), the system being capable of describing a function which can monitor a call of a graphics library of the operating system.

The display 116, although it is not limited to this, preferably has a resolution of 1024 by 768 or over, and is an LCD monitor of a 32-bit true color.

The keyboard 110 and the mouse 112 follow a graphic user interface provided by the operating system, and are used to operate graphic objects such as an icon, a task bar, and a window, which are displayed on the display 116.

Figure 2:
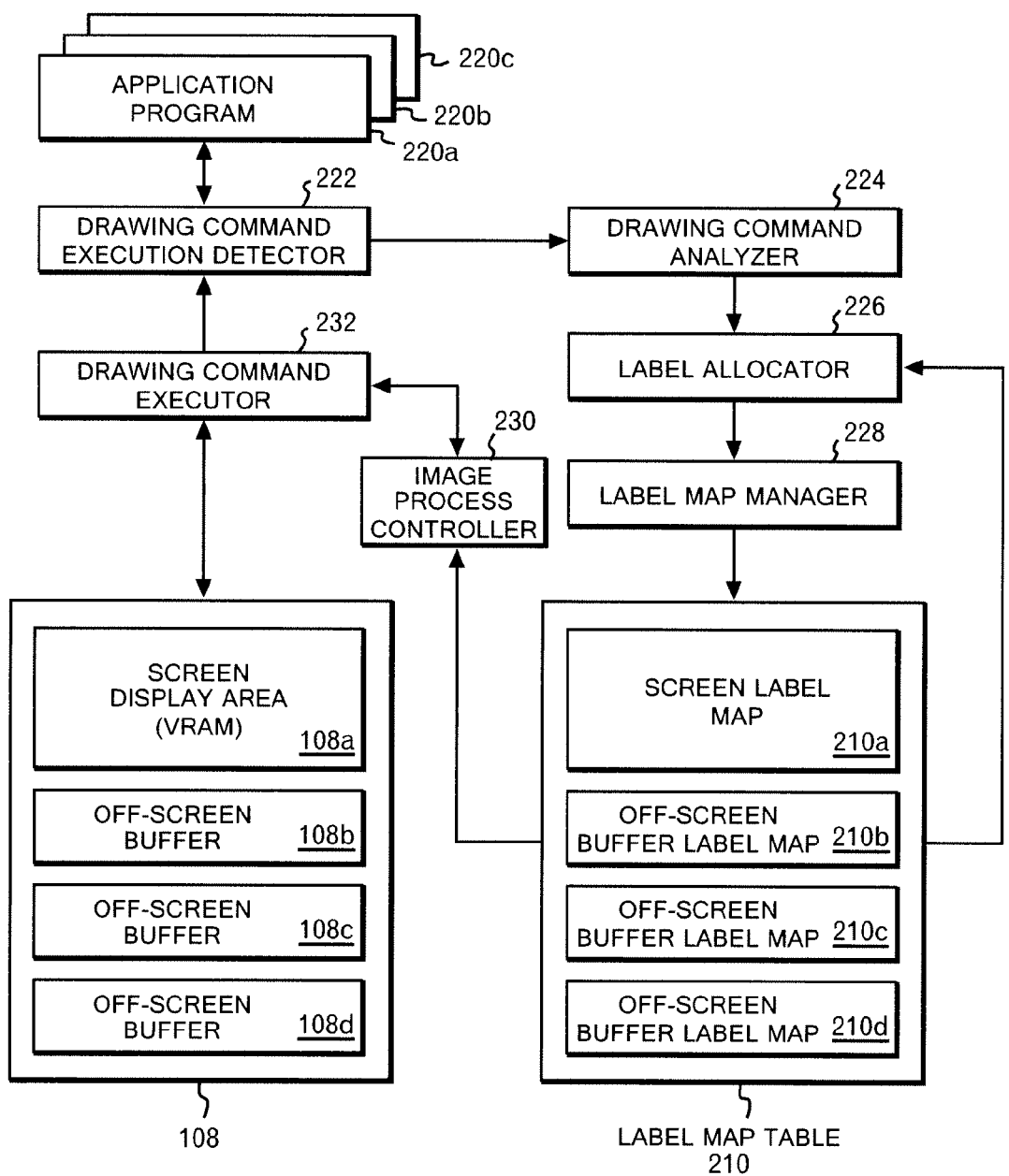
FIG. 2 is a functional block diagram of a label map management mechanism according to an embodiment of the present invention.

FIG. 2 is a block diagram of a logical configuration of the embodiment. In FIG. 2, the VRAM 108 contains a screen display area 108a, and a plurality of off-screen buffers 108b, 108c, 108d . . . . Each off-screen buffer is created, changed and cleared by an application program. However, even when the application program simply creates an off-screen buffer, the newly-created off-screen buffer is not reflected on the screen of the display 116 (FIG. 1). The off-screen buffer becomes visible on the screen only after the off-screen buffer is copied into the screen display area 108a. For example, a certain application program whose window is minimized executes a command to create an image, and a result thereof may bring a change in the off-screen buffer. However, such a change in the off-screen buffer is not reflected on the screen display area 108a until the minimized window of the application program is restored or maximized. In short, the user cannot see the image until then.

The off-screen buffers 108b, 108c, 108d . . . are basically allocated in the VRAM 108, but are allocated in the main memory 106 when there is no sufficient free space in the VRAM 108.

A label map table 210 is one of characteristic configurations used in the present invention. The label map table 210 is preferably allocated in the VRAM 108 by calling an API function such as CreateBitmap and CreateCompatibleBitmap. An API function such as a normal GlobalAlloc can be used to allocate the label map table 210 in the main memory 106. The label map table 210 includes a screen label map 210a and off-screen buffer label maps 210b, 210c, 210d . . . , corresponding to the screen display area 108a and the plurality of off-screen buffers 108b, 108c, 108d . . . , respectively. While a drawing content for the screen is stored in the off-screen buffer, what is stored in the off-screen buffer label map is a security label. A single security label can be allocated to each of the off-screen buffer label maps. In the embodiment, allocating a security label indicates writing a security label (for example, 1) to all over a bit map area allocated by an API function such as CreateBitmap as the off-screen buffer label map. In the present invention, access control is performed based on a logical operation of the off-screen buffer label map on the screen label map 210a. Detailed operations thereof will be given later.

With reference to the top of FIG. 2, shown are a plurality of application programs 220a, 220b, 220c . . . , which are generally stored in the hard disk drive 110. These application programs are, in response to the operations of the keyboard 112 and the mouse 114, loaded into the main memory 106 from the hard disk drive 110 by the function of the operating system and are executed.

According to the present invention, security labels such as 1 to 3 are assigned to the plurality of application programs 220a, 220b and 220c. Here, the larger the number is, the higher the security level is. As a technology for assigning a security level to an application program or a process created by an application program, there is a technology described in Japanese Patent Application Laid-open Publication No. 2007-65846, for example. The technology disclosed therein monitors messages transmitted/received between application programs on an operating system, changes and prohibits the processing based on a policy described separately. Note that in the following descriptions, a security level in the context in Japanese Patent Application Laid-open Publication No. 2007-65846 is taken as the same as a security label assigned to an application program here.

The following is an example of a policy on setting a security label for each file. Described is a security level in which <Rule RuleId="urn:rule1"> is set. In other words, a plurality of security levels such as "urn:rule0 and "urn:rule2 other than urn:rule1. Moreover, at a part of <AttributeValue DataType="file:path"> to </AttributeValue>, an application program, to which a security label thereof is applied, is described.

```
<!-- Group 1 -->
<Rule RuleId="urn:rule1">
    <Description>Deny clipboad copy and print by notepad and calc</Description>
    <Subjects>
        <Subject>
            <AttributeValue
                DataType="file:path">calc.exe< /AttributeValue>
        </Subject>
        <Subject>
            <AttributeValue
                DataType="file:path">notepad.exe</AttributeValue>
        </Subject>
    </Subjects>
<Resources>
    <Resource DataType="clipboard"
    Lib="SBLCLIP">
            <!--Prohibit copying to clipboard -->
            <AttributeValue DataType="clipboard:type">
            <AnyClipboardDataType/>
            </AttributeValue>
            <Actions>
            <Action Effect="Deny">write</Action>
            </Actions>
    </Resource>
..........
..........
</Rule>
```

Similarly, although it is possible to set a security level for each process created by the application program, the function itself is not the main point of the present invention. Hence, the more detailed descriptions thereof will be omitted. Refer to Japanese Patent Application Laid-open Publication No. 2007-65846 and other conventional technologies where necessary. Note that although the above policy does not clearly state, it is desirable that a lowest-level security label should be assigned to application programs in which a security label is not specified. Due to this, an unidentified application program is prevented from obtaining confidential information from a video memory in an unintended situation.

Returning to FIG. 2, a drawing command execution detector 222 monitors drawing commands issued by the application programs 220a, 220b and 220c by using functions similar to the above while those application programs obtain the security levels of the processes which have issued the drawing commands. As such typical drawing commands, there are BitBlt and StretchBlt.

Drawing command analyzer 224 analyzes the type and the parameter of the drawing command detected by the drawing command execution detector 222. The drawing command analyzer 224 then discriminates what kind of image is left on the screen as a result of the execution of the drawing command.

Label allocator 226 refers to a security level which has been allocated to the application program or the process, and decides a label value allocated onto the screen label map 210a. Note that in the descriptions of the embodiment, the descriptions are given regarding the security label of the application program the same as the label of a label map corresponding to the security label.

Label map manager 228 manages labels of a screen and an off-screen in a free space in the VRAM 108 or the main memory 106.

Image process controller 230 carries out the mask process and the like by determining whether or not it is possible to read in while referring to the label map.

Drawing command executor 232 is a function unit which performs the drawing. In one example, the drawing command executor 232 delivers a drawing API function to the operating system in order to actually perform the drawing.

Figure 3:
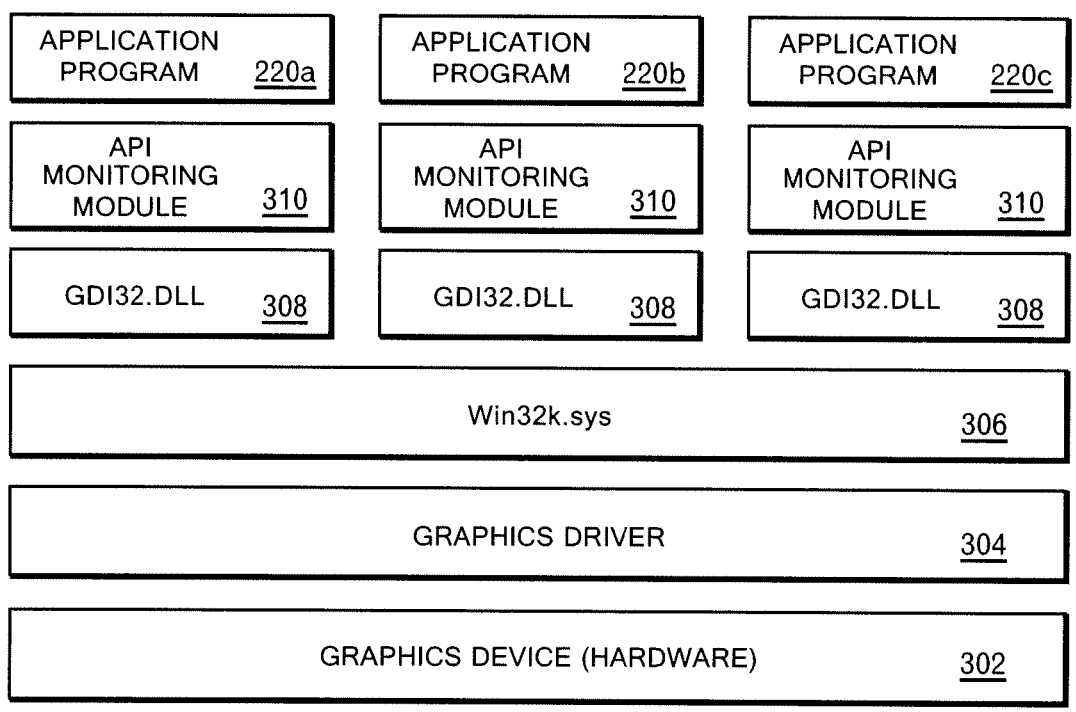
FIG. 3 is a block diagram showing an example of a configuration for realizing a drawing monitoring function.

FIG. 3 is a view showing an outline of mechanism for monitoring application programs, in which the present invention can be used. A lowest layer 302 is hardware of a graphics device, and above the layer 302 is a layer 304 of a graphics device driver which is provided by a hardware maker of the graphics device. Above the layer 304 is a layer 306 of a Win32k.sys device driver which implements a Win32 graphic sub-system. Above the layer 306 is a layer 308 of GDI32.DLL including APIs related to specific graphics. Then, between GDI32.DLL and each application program is an API monitoring module 310 which monitors a graphics related APIs issued by the application program. Such a monitoring function is carried out by the drawing command execution detector 222 in FIG. 2. This monitoring-module technology is basically the one disclosed in Japanese Patent Application Laid-open Publication No. 2007-65846 which relates to the applicant of this application.

Figure 4:
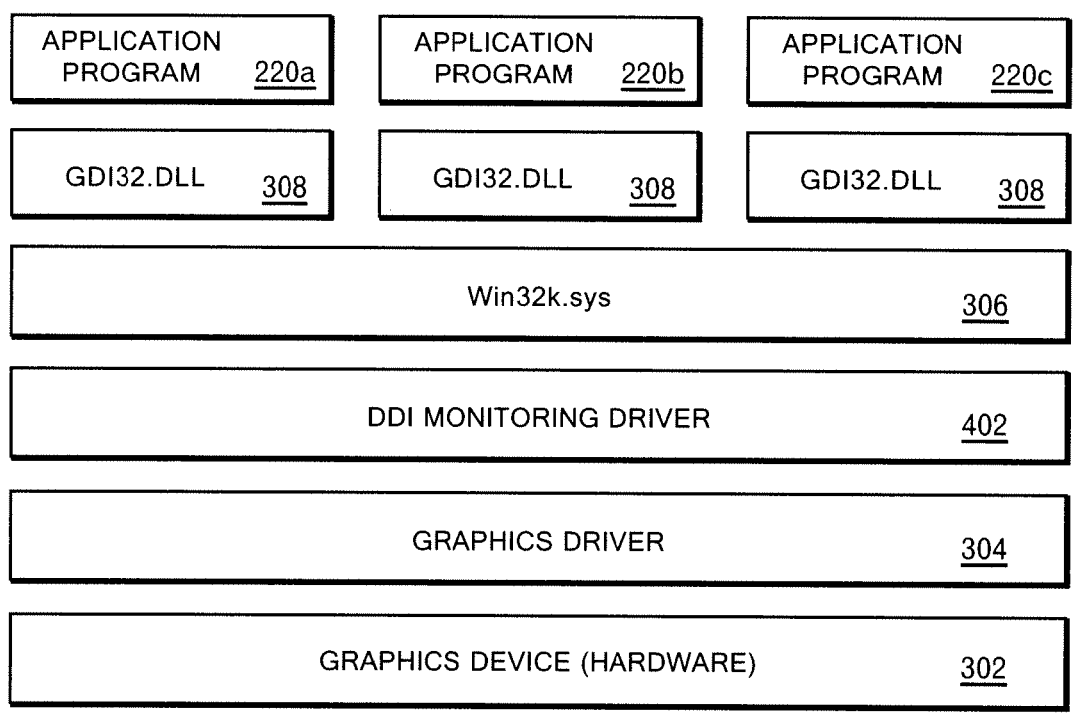
FIG. 4 is a block diagram showing another example for realizing the drawing monitoring function.

FIG. 4 is a view showing an outline of another mechanism for monitoring application programs, in which the present invention can be used. The difference between the example of FIG. 4 and the example of FIG. 3 is that a DDI monitoring driver in FIG. 4 monitors a drawing command sent to the graphics driver from GDI32.DLL by putting a layer 402 of the DDI monitoring driver between the layer 304 of the graphics driver and the layer 306 of the Win32k.sys device driver instead of putting the API monitoring module 310 specific to the application program between GDI32.DLL and the application program. Such a monitoring function is carried out by the drawing command execution detector 222 in FIG. 2. This monitoring-module technology is basically the one disclosed in Japanese Patent Application Laid-open Publication No. 2002-278526 which relates to the applicant of this application.

The API monitoring module 310 is required to perform the clipping process on a window in the case of the monitoring mechanism of FIG. 3. On the other hand, in the case of the monitoring mechanism of FIG. 4, the time and trouble with the clipping process are saved since visible area information on which the clipping process has been carried out is conveyed to the DDI monitoring driver.

Next, descriptions will be given of a function of a drawing command monitoring module which is used by the drawing command execution detector 222 of FIG. 2. In the embodiment, the drawing command monitoring module is the API monitoring module 310 of FIG. 3 or the DDI monitoring driver 402 of FIG. 4.

Firstly, each process is predicated on the allocation of a label as an appropriate security level. Here, given that as a label value is higher, the higher confidential information is handled. At this point, an administrator may allocate a label to each process in advance by the method described in Japanese Patent Application Laid-open Publication No. 2007-65846, for example. Or rather, a label may dynamically be allocated in accordance with contexts such as an open file, a network address, and screen output character information by a method described in U.S. patent application Ser. No. 11/755,769 applied on May 31, 2007, the application being related to the applicant of this application.

On the other hand, whenever each process issues a drawing command, the drawing command monitoring module allocates a security label to a drawing area on the screen and the off-screen buffer in accordance with the attribute of a drawing process and the type of a drawing command.

The drawing command monitoring module firstly analyzes the type and the parameter of a drawing command, and abstracts the drawing command into the following operation expression:

$$out=OP(src, dst, pat)$$

Here, OP indicates the type of drawing command (Operation), src indicates an image targeted to be processed (Source), dst indicates an existing image (Destination) in a drawing area, and pat indicates an image element (Pattern) used for the operation. Furthermore, out indicates an image after executing the drawing command, and src and dst may be visible areas on the screen, or may be the off-screen buffer in the VRAM 108 or the main memory 106 (memory).

For example, a command to move an image on the screen to another area is represented as:
OP=SourceCopy
src=Screen
dst=Screen
pat=NULL
out=src When a specific screen area is filled in with black, a command is represented as:
OP=PatternCopy
src=NULL
dst=Screen
pat=Black
out=pat A bitmap translucent drawing command from the off-screen buffer to the screen is represented as:
OP=AlphaBlend
src=Memory
dst=Screen
pat=NULL
out=(src OR dst)

A reverse image in a specific screen area is represented as:
OP=DestInvert
src=NULL
dst=Screen
pat=NULL
out=(NOT dst)

The number of the types of drawing commands is 256 in accordance with logical operation patterns of src, dst, and pat. Moreover, the types of drawing commands also include, as a command not to draw, a command to create an off-screen memory, CreateBitmap, and the like. After abstracting the drawing command in this manner, the drawing command monitoring module determines how an existing image (Destination) in an area of a drawing destination is processed by the drawing command. Then, the drawing command monitoring module decides the security label of the area of the drawing destination based on the determination result as follows:

When filling the existing image in the area of the drawing destination by executing the drawing command, the security label of a process which issues the drawing command, or the security label of a source area is allocated. As an example of this type of command, there is BitBlt which carries out a bit block transfer, and taken is the following arguments:

```
BOOL BitBlt(HDC hdcDest, int nXDest, int nYDest, int nWidth, int nHeight,
    HDC hdcSrc, int nXSrc, int nYSrc, DWORD dwRop)
```

Here, hdcDest is a handle of a device context of a copy destination, nXDest is an x coordinate of a logical unit in the upper left corner of the copy destination, nYDest is a y coordinate of a logical unit in the upper left corner of the copy destination, nWidth is the width of a logical unit of a rectangle of the copy destination, nHeight is the height of a logical unit of the rectangle of the copy destination, hdcSrc is a handle of a device context of a copy source, nXSrc is an x coordinate of a logical unit in the upper left of the copy source, nYSrc is a y coordinate of a logical unit in the upper left corner of the copy source, and dwRop is a raster operation code. In a case of dwRop=SRCCOPY, the rectangle of the copy source is processed by being copied as the rectangle of the copy destination. In this case, when abstracting into a form of out=OP (src, dst, pat), pat=NULL since it is not filled in with a designated pattern. Moreover, since it is a block transfer from screen to screen by setting dwRop=SRCCOPY, OP=SourceCopy, src=Screen, dst=Screen, and out=src. When writing onto the screen from the off-screen buffer, src=Memory. In addition, it is possible to select the off-screen buffer as dst. In this case, dst=Memory.

As another example, let's cite PatBlt which draws a rectangle area with a brush, which is:

```
BOOL PatBlt(HDC hdc, int nXLeft, int nYLeft, int nWidth,
    int nHeight, DWORD dwRop)
```

Here, hdc is a handle of a device context, nXLeft is an x coordinate of a logical unit in the upper left corner in the rectangle area, nYLeft is a y coordinate of a logical unit in the upper left corner of the rectangle area. When abstracting into the form of out=OP (src, dst, pat), src=NULL, dst=Screen, OP=PatternCopy, and out=pat by setting dwRop=PATCOPY. Here, pat is a pattern made by a brush which is currently being selected in the device context.

When the existing image information in the drawing destination area is left as it is after executing the drawing command, the existing label is succeeded. As an example of this type of command, there is BitBlt in which DSTINVERT (destination reverse) is designated as a raster operation code. In this case, src=NULL, dst=Screen, pat=NULL, and out=NOT (dst).

When the result of combining the existing image and a new image is displayed after executing the drawing command, the higher of the existing label or the new label is allocated. As an example of this type of command, cited are BitBlt in which MERGECOPY (an AND operation for the copy source and the copy destination) is designated as a raster operation code, and AlphaBlend (translucent drawing). Incidentally, AlphaBlend is as follows:

```
BOOL AlphaBlend(HDC hdcDest, int nXDest, int nYDest,
    int nDestWidth, int nDestHeight, HDC hdcSrc, int nXSrc, int nYSrc, int nSrcWidth,
    int nSrcHeight, BLENDFUNCTION BlendFunction)
``` hdcDest is a handle of device context of a copy destination, nXDest is an x coordinate of a logical unit in the upper left corner of the copy destination, nYDest is a y coordinate of a logical unit in the upper left corner of the copy destination, nDestWidth is the width of a logical unit of a rectangle of the copy destination, nDestHeight is the height of a logical unit of the rectangle of the copy destination, hdcSrc is a handle of the device context of a copy source, nXSrc is an x coordinate of a logical unit in the upper left corner of the copy source, nYSrc is a y coordinate of a logical unit in the upper left corner of the copy source, nSrcWidth is the width of a logical unit of a rectangle of the copy source, nSrcHeight is the height of a logical unit of the rectangle of the copy source, and BlendFunction is a structure to designate a function which performs AlphaBlend. In this case, when abstracting into the form of out=OP (src, dst, pat), src=Screen, dst=Screen, and pat=NULL. Furthermore, although out=(src OR dst), the OR here is not a logical OR operation, but is the result of AlphaBlend based on BlendFunction. When performing AlphaBlend from the off-screen buffer to the screen, src=Memory.

As described above, the descriptions have been given of the abstraction of some typical API functions for drawing, but those skilled in the art will understand that it is possible to handle other API functions for drawing in the same manner.

Returning to FIG. 2, when the drawing is newly performed in the screen display area 108a, or the off-screen buffer 108b and the like are copied into the screen display area 108a so that a new drawing appears, in response to this, the writing in the area of a corresponding security label is performed on the screen label map 210a. When managing the label map table 210 in the main memory 106, it is possible to use a copy function of a cycle such as memcpy as the copy. Additionally, it is also possible to use the above-mentioned BitBlt when managing the label map table 210 as a part of the image buffer 108.

When the label of a certain area agrees with the label of an adjacent area due to repeated writes into the screen label map 210a, these areas are merged for the convenience of the processing. These will be more deeply understood later by explanations based on concrete examples.

Figure 5:
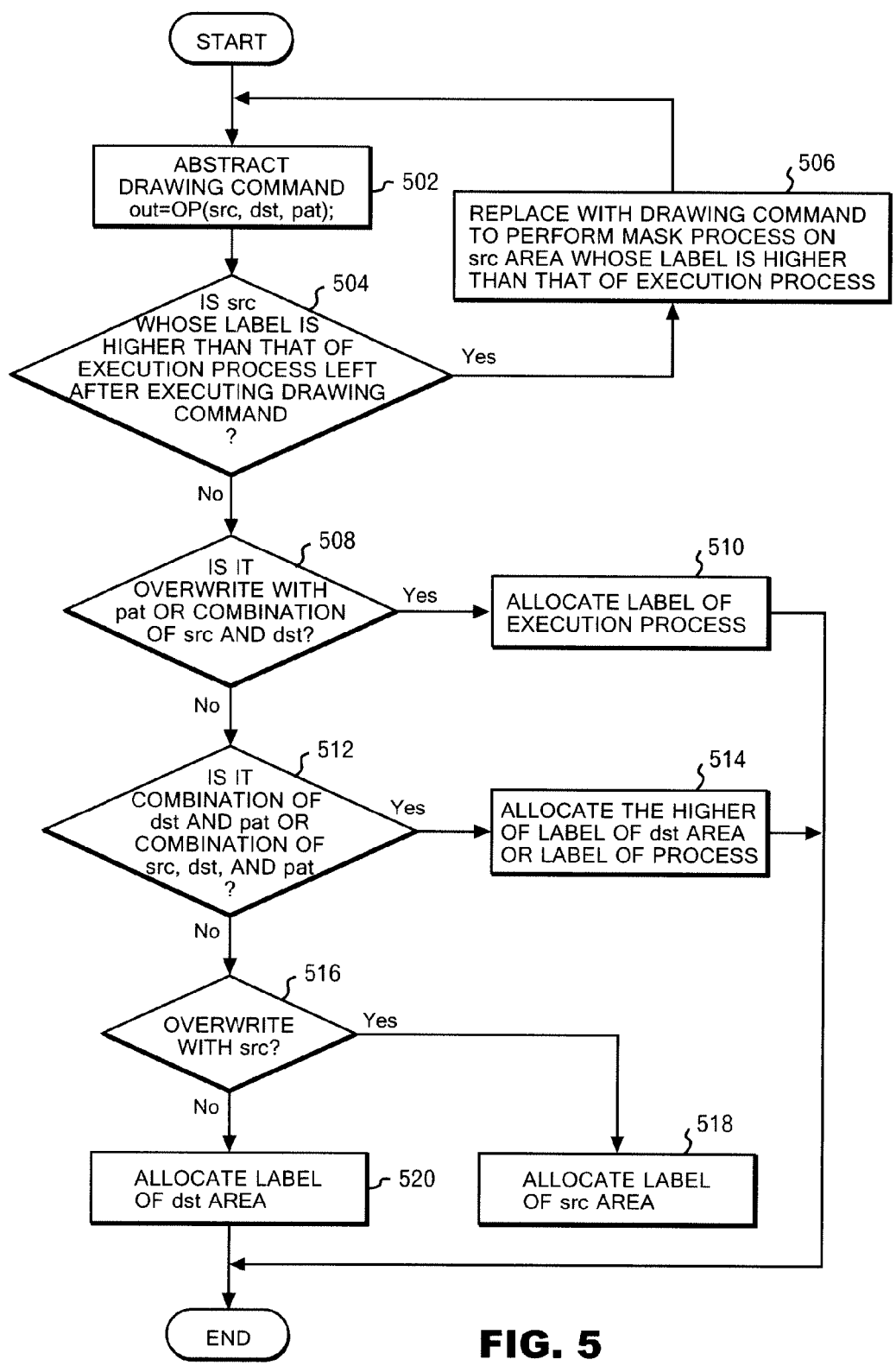
FIG. 5 is a flow chart of a label map management process according to the embodiment of the present invention.

FIG. 5 is a flow chart of a label allocation process according to the embodiment of the present invention. The flow chart starts when the drawing command execution detector 222 of FIG. 2 detects a drawing command in arbitrary application programs 220a, 220b, . . . . At Step 502, the detected drawing command is abstracted into the form of out=OP (src, dst, pat) as described above.

Note that when considering the area of out with out=OP (src, dst, pat), out can be divided into areas with various conditions by a distribution of the label of the screen label map 210a which is the source where it is drawn. The various determining steps in FIG. 5 should be understood that determination and processes are performed for each area of out which has different condition.

At Step 504, it is determined whether or not src with a label higher than that of an execution process is left in out after executing a drawing command. In other words, the drawing command is the overwrite of src, the combination of src and pat, the combination of src and dst, or the combination of all src, dst and pat, and also is a case of including the label of the src area higher than the label of the execution process.

When the determination at Step 504 is Yes, at Step 506, the drawing command is converted to a drawing command which performs the mask process on the src area with the label higher than that of the execution process. Specifically, this adopts a method for detecting a coordinate of the src area with the label higher than that of the execution area, filling in the detected coordinate area with black by, for example, PatBlt, and the like. The drawing command corresponding to this area filled in with black performs the processing as the process of a label 1. Accordingly, the label 1 is written into a label map table area corresponding to out. Consequently, when the processing goes again to the determination step of Step 504 from Step 502, the determination does not result in Yes so that the processing does not go to Step 506. Note the label value of the detected coordinate area may be set to be the same label value as the execution process instead of resetting the label value to "1". Furthermore, the above process to fill in with black, namely, is one which makes the screen information of the relevant area meaningless. Hence, arbitrary screen processes such as hiding, shading, and writing in white of the original information can be used.

When the determination is No at Step 504, it is determined at Step 508 whether out is overwritten with pat or is the combination of src and pat. If the determination is Yes, the label of the execution process is allocated to the out area at Step 510.

When the determination is No at Step 508, it is determined at Step 512 whether out is the combination of dst and pat or the combination of src, dst, and pat. If the determination at Step 508 is Yes, the higher of the label of dst or the label of the execution process is allocated in out at Step 514.

When the determination is No at Step 512, it is determined at Step 516 whether or not out is overwritten with src. If the determination is Yes, the label of the src area is allocated to out at Step 518. If the determination is No, the label of the dst area is allocated to out at Step 520.

Next, more specific descriptions will be given of the processing of the embodiment of the present invention, following the views of the screen.

Figure 6:
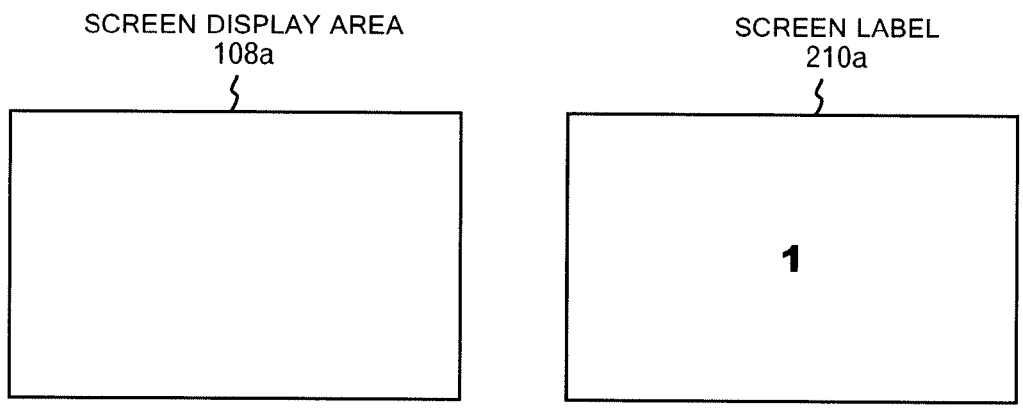
FIG. 6 is a view showing the correspondence between screen areas and screen label maps.

FIG. 6 shows a state of a computer with a hardware configuration shown in FIG. 1 immediately after startup. In the following drawings, the screen display area 108a is arranged in parallel with the corresponding screen label map 210a. It is possible to use an API function such as CreateBitmap to secure an area of the screen label map 210a when using a VRAM area as the screen label map 210a. It is possible to use an API function such as GlobalAlloc when using a main memory as the screen label map 210a. Given that nothing is displayed in the screen display area 108a in FIG. 6 since it is immediately after startup. On the other hand, '1' is buried in all bitmaps in the screen label map 210a as a default security label value. A copy thereof can use BitBlt when the screen label map 210a uses the VRAM area. When the screen label map 210a is in the main memory 106, memcpy and the like can be used for the copy.

Figure 7:
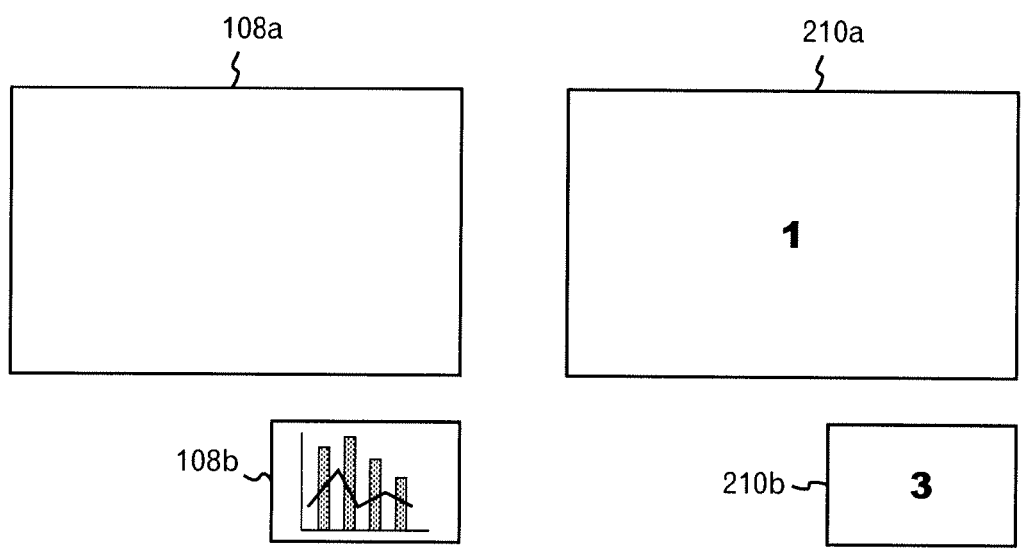
FIG. 7 is a view showing the correspondence between screen areas and screen label maps.

Next, as shown in FIG. 7, the process of a label 3 tries to allocate the area 108b in the off-screen buffer and draw a graph therein. Following this, the drawing command execution detector 222 in FIG. 2 detects a drawing command of the process of the label 3. In response to it, the drawing command analyzer 224 operates on the label allocator 226, and the off-screen label map area 210b in which the number of 3 is buried is allocated in the label map table 210. Then, the image process controller 230 operates on the drawing command executor 232. With this, the drawing command detected by the drawing command execution detector 222 is passed to the drawing command executor 232. In this manner, the drawing of the graph is actually performed in the area 108b, but the graph drawn in the off-screen buffer area 108b cannot be seen on the screen at this stage.

Figure 8:
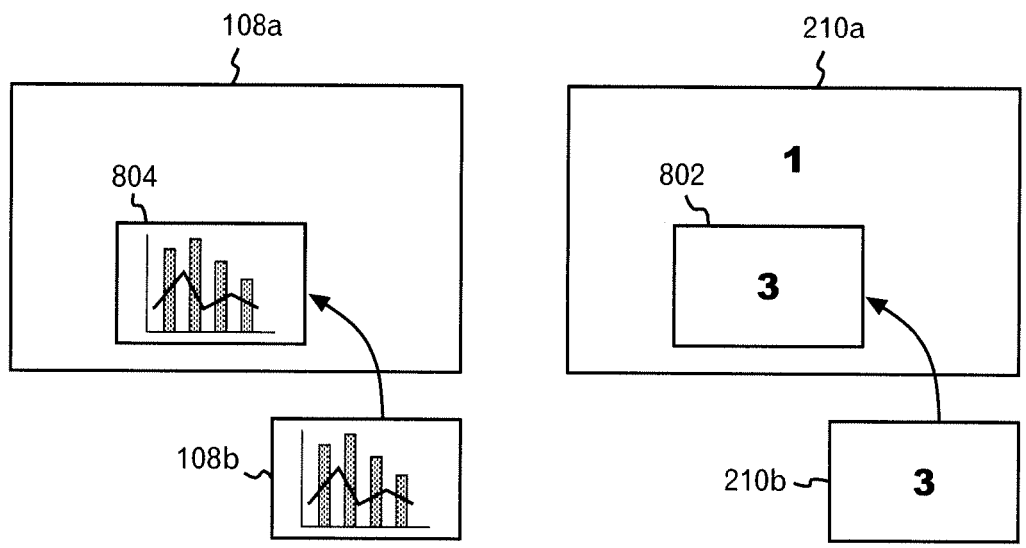
FIG. 8 is a view showing the correspondence between screen areas and screen label maps.

Next, as shown in FIG. 8, the process of the label 3 tries to copy the off-screen buffer area 108b where the graph has been drawn in the screen display area 108a by use of BitBlt. Then, the drawing command is detected by the drawing command execution detector 222. In response to it, the drawing command execution analyzer 224 operates on the label allocator 226 to calculate the resulting image. As a result, since src whose label is higher than that of the execution process is not left, Step 504 is No. In addition, since it is neither overwrite with pat nor the combination of src and pat, Step 508 is No, too. Since it is not the combination of dst and pat, Step 512 is No, too. The answer is Yes for the first time when determining whether or not it is overwrite with src at Step 516. Hence, the label 3 of src is allocated at Step 518, and the off-screen label map area 210b is copied to the screen label map 210a to become an area 802 as shown in FIG. 8. In response to this, the screen process controller 230 operates on the drawing command executor 232. Consequently, the drawing command detected by the drawing command execution detector 222 is passed to the drawing command executor 232. This results in copying the off-screen buffer area 108b to the screen display area 108a and making an image 804 copied in this manner visible to a user.

Figure 9:
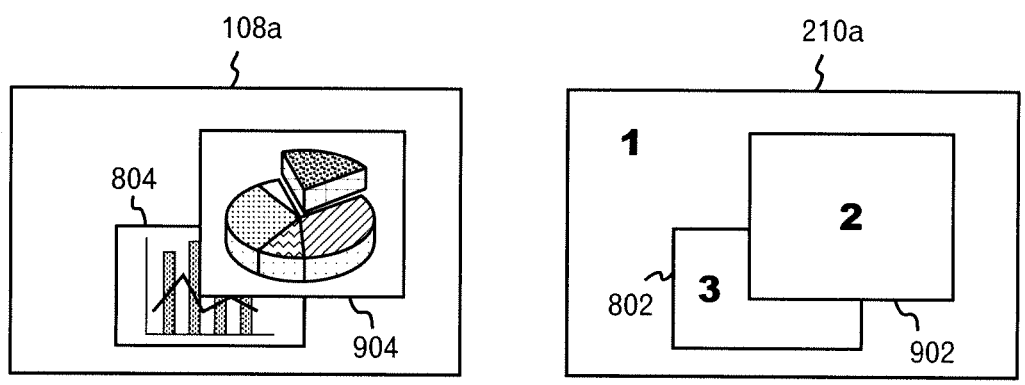
FIG. 9 is a view showing the correspondence between screen areas and screen label maps.

In FIG. 9, another process to which a label 2 has been allocated tries to display another graph 904 in a manner of overwriting a part of the area of the label 3. Since an area whose label is higher than the label 2 is not left in out displayed by the process to which the label 2 has been allocated, Step 504 is No. Steps 508 and 512 are also No. A determination whether or not it is overwrite with src at Step 516 is Yes. The allocation of the label 2 is performed in an area 902 of out in the off-screen label map area 210b at Step 518. Hence, it is permitted to display the image 904 in the actual screen label map 210a in a manner of overwriting a part of the area of the label 3.

Figure 10:
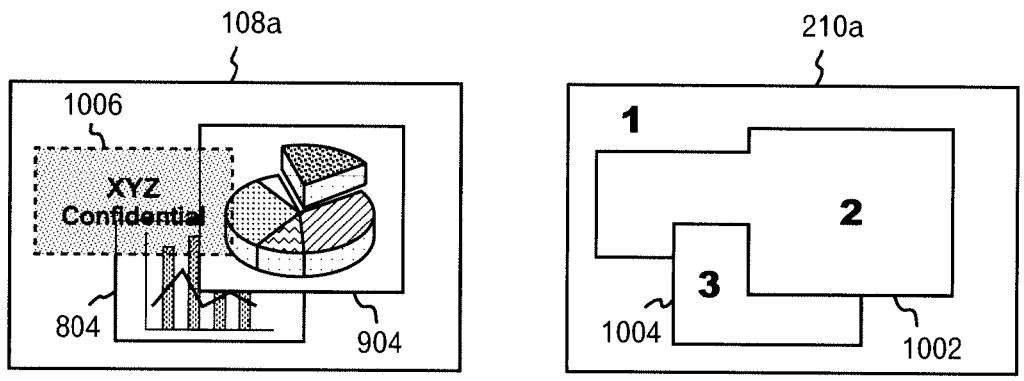
FIG. 10 is a view showing the correspondence between screen areas and screen label maps.

In FIG. 10, still another process to which the label 2 has been allocated is to display a translucent area 1006 in a manner of overwriting both a part of the already-drawn area 804 of the label 3 and the already-drawn area 904 of the label 2. At this point, since an area whose label is higher than the label 2 is not left in out displayed by the process to which the label 2 has been allocated, Step 504 is No. Since it is neither overwrite with pat nor the combination of src and pat, Step 508 is also No. However, at Step 512 a determination as to whether or not it is the combination of src and dst is Yes for a part where the area 804 is overlapping the area 1006. Step 514 is applied to this part, that is, the higher of the label of the dst area or the label of the execution process is allocated thereto. Hence, the label of the part where the area 804 is overlapping the area 1006 is 3. In addition, both a label corresponding to the area 1006 and a label corresponding to the area 904 are 2. Consequently, the area 1006 and the area 904 are merged in the label map area 210*a* as shown in FIG. 10.

Figure 11:
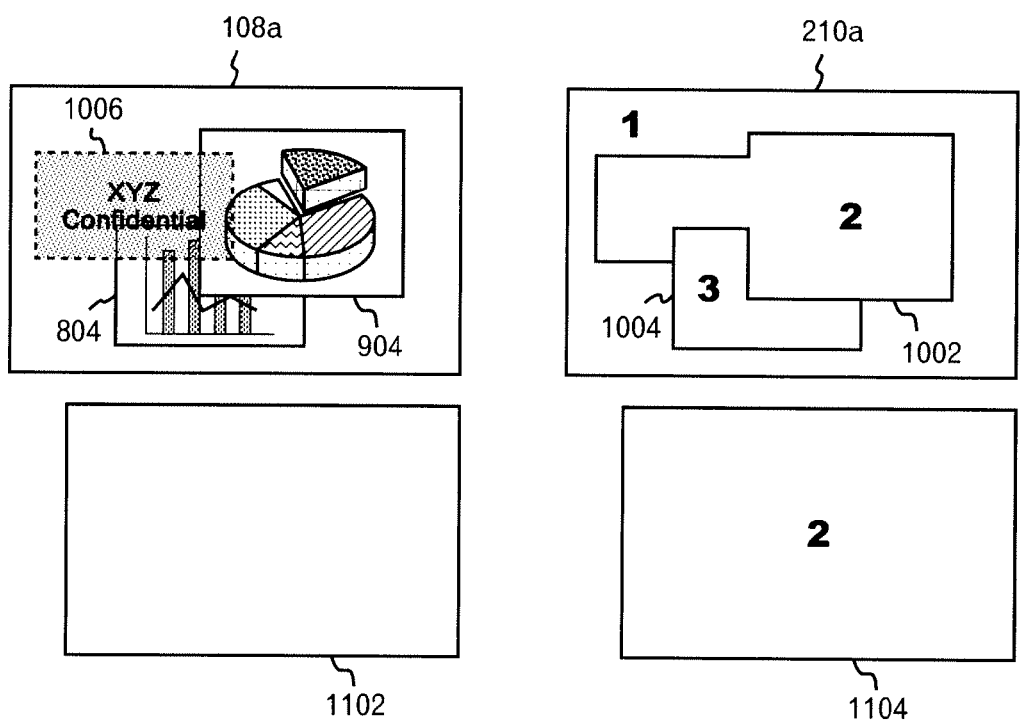
FIG. 11 is a view showing the correspondence between screen areas and screen label maps.

Next, as shown in FIG. 11, yet another process to which the label 2 has been allocated allocates a blank area 1102 in the off-screen buffer. In response to this, an area 1104 of the label 2 is allocated by the label allocator 226 in the label map table 210.

Figure 12:
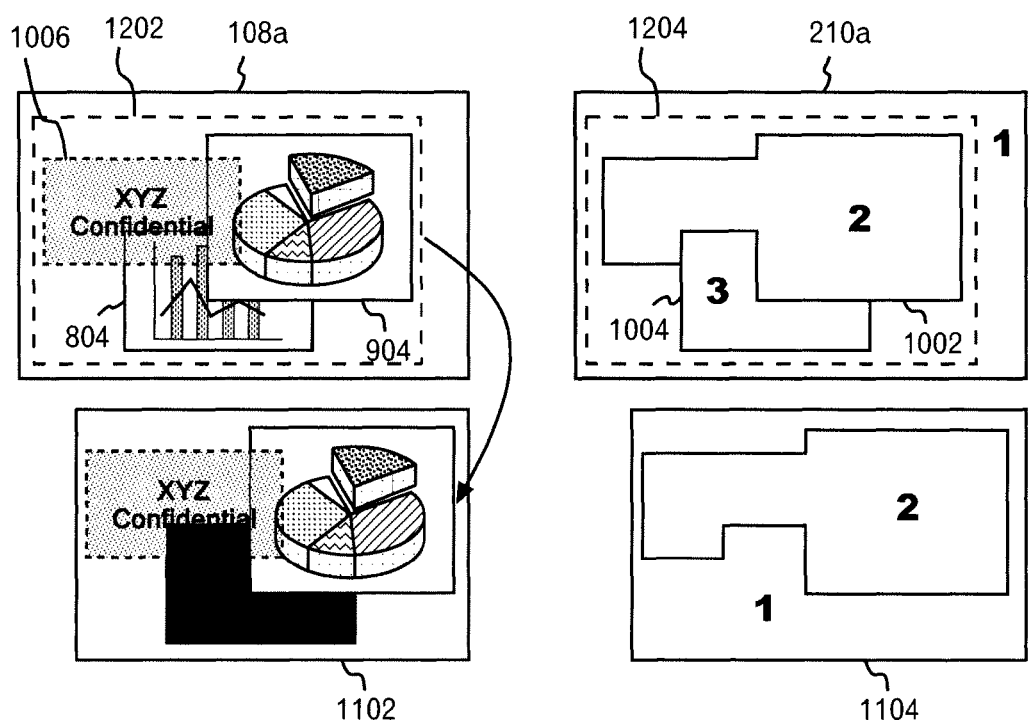
FIG. 12 is a view showing the correspondence between screen areas and screen label maps.

Next, as shown in FIG. 12, the same process of the label 2 as the one to have allocated the blank area 1102 tries to copy an area 1202 shown with a dashed line to the area 1102. Such a copy issues a drawing command such as BitBlt so that the drawing command is detected by the drawing command execution detector 222, and the determination of the flow chart in FIG. 5 is made.

Hence, on the assumption that the area 1202 would be copied to the area 1102, an area 1004 of the label 3 is typically subjected to entering an area 1104 of the label 2 to be out, as can be seen with reference to the screen label map 210*a* of FIG. 12. This indicates that src with a high label is left in the drawing command by the execution process. Corresponding to the area 1004, the determination at Step 504 results in Yes. Consequently, the copy to the off-screen buffer 1102 from an image display area corresponding to the area 1004 of the label 3 of the screen label map 210*a* is replaced with a black-fill of not BitBlt but PatBlt by the image process controller 230 at Step 506. Thus, as shown in FIG. 12, when having been copied to the off-screen buffer 1102, a visible part of the area of the label 3 is copied while being filled in with black. Hence, the part is alone which cannot be seen. Accordingly, it is possible to prevent the content of a process whose label is relatively high from being copied to a process whose label is relatively low, so that the security protection is provided. Note that as described in relation to Step 506 of FIG. 5, since a black fill can be replaced with a drawing process of the label 1, the off-screen label map 1104 becomes a state where the area of the label 3 has been rewritten into the label 1 in the src area corresponding to the screen label map 210*a* as shown in FIG. 12.

Note that characters of "XYZ Confidential" are put in the translucent area shown in FIG. 10. The display of characters on a window can be performed by use of an API function of TextOut. Consequently, such a character string output itself can be detected by the drawing command execution detector 222 of FIG. 2. Hence, in response to the detection of an API function including the output of specific character strings such as "xxx confidential", the label of the process may be increased by one, or it may be set to be a preset absolute value.

Moreover, in a case of a translucent combining process accompanied with the bleed process of a background, the label level of the process may be decreased by one, by determining that readability has decreased, based on one or both of parameters of a bleed degree and a font size. The process block which performs such a detection process is not clearly shown in FIG. 2. However, such a function can be added to the configuration in FIG. 2 because both a bleed degree and a font size can be obtained by use of an appropriate API function.

Such a label change process can be performed by extending the function of the drawing command analyzer 224 of FIG. 2.

In the above embodiment, a label map is operated by monitoring a drawing command from a monitoring program which runs on an operating system. Thereby, a desired security management function of a screen is achieved. However, the function of the present invention may be equipped as a native function of the operating system by editing and building source codes of the operating system, if allowed.

With the present invention, it is possible to effectively prohibit access to a confidential information image on a screen from malicious programs and general programs since, whenever a drawing command is executed, what kind of information is inherited by a drawing result is determined from a logical operation pattern of a drawing command, and the access is controlled. Concurrently, access control is flexibly performed by allocating an appropriate security label even in a case of a translucent window.

Although the preferred embodiment of the present invention has been described in detail, it should be understood that various changes, substitutions and alternations can be made therein without departing from spirit and scope of the inventions as defined by the appended claims.

The invention claimed is:

1. A screen information protection system for protecting information on a screen in a computer having a memory which image data can be written to and read from, when image data in the memory is displayed on the screen in response to a drawing command of an application program associated with a security label, comprising:
  label map storage means having on-screen security label map information corresponding to a screen display area in the memory, and having at least one off-screen buffer label map information corresponding to an off-screen buffer;
  detecting means for detecting a command to read image data from a read area in the memory, the read area designated by the application program; and
  control means for checking at least one of the on-screen security label map information or the at least one off-screen buffer label map information corresponding to the read area in the label map storage means in response to the detection by the detecting means, and for prohibiting the application program from performing read operation from the read area in response to the security label of the application program being lower in level than that of the read area.

2. The screen information protection system according to claim 1, wherein the read operation from the read area is prohibited by replacing a write command for a destination of the information to be read, with a fill command.

3. The screen information protection system according to claim 1, further comprising means for writing information of security label in response to a write command of the application program for an area of a video memory, the information being written onto a corresponding area in the label map storage means.

4. The screen information protection system according to claim 1, wherein the label map storage means is arranged in an area which does not correspond to the screen in the memory.

5. The screen information protection system according to claim 1, further comprising means for changing a security label of the read area in response to specific characters in the read area.

6. The screen information protection system according to claim 1, further comprising means for changing the security label of the read area in response to one or both of a font size and a bleed degree of the read area.

7. A computer implemented screen information protecting method for protecting information of a screen, in a computer having a memory which image data can be written to and read from, in a system which displays image data in the memory on a screen in response to a drawing command of an application program associated with a security label, comprising the steps of:

writing on-screen security label map information corresponding to a screen display area into a label map storage means;

writing at least one off-screen buffer label map information corresponding to an off-screen buffer into the label map storage means;

detecting a command to read the image data from a read area in the memory, the read area designated by the application program;

checking at least one of the on-screen security label map information or the off-screen buffer label map information corresponding to the read area in the label map storage means in response to the detection; and prohibiting the application program from performing a read operation from the read area in response to the security label of the application program being lower in level than that of the read area.

8. The method according to claim 7, wherein the writing step is performed in response to a write command of the application program for an area of the video memory, and the on-screen security label map information or off-screen buffer label map information written into the label map storage means is associated with the security label of the application program.

9. The method according to claim 7, wherein the prohibiting step includes the step of replacing the write command with a predefined drawing pattern write command when information to be read from the read area is written into a destination area.

10. The method according to claim 7, further comprising the step of changing the security label of the read area in response to specific characters in the read area.

11. The method according to claim 7, further comprising the step of changing the security label of the read area in response to one or both of a font size and a bleed degree of the read area.

12. A program embodied in a non-transitory computer readable medium for causing a computer, having a memory which image data can be written to and read from, to protect information on a screen in a system in which image data in the memory is displayed on the screen in response to a drawing command of an application program associated with a security label, the program causing the computer to execute the steps of:

writing on-screen security label map information corresponding to the screen into a label map storage means in the memory;

writing off-screen buffer label map information corresponding to an off-screen buffer into the label map storage means in the memory;

detecting a command to read image data from the memory by the application program's designating a read area in the memory;

checking at least one of the on-screen security label map information or the off-screen buffer label map information corresponding to the read area in the label map storage means in response to the detection; and prohibiting the application program from reading from the read area in response to the security label of the application program being lower in level than that of the read area.

13. The program according to claim 12, wherein the writing step is performed in response to a command of the application program to write into an area of the video memory, and at least one of on-screen security label map information or off-screen buffer map information written into the label map storage means is associated with the security label of the application program.

14. The program according to claim 12, wherein the prohibiting step includes the step of replacing a write command with a predefined drawing pattern write command when writing information to be read from the read area into a destination area.

15. The program according to claim 12, further comprising the step of changing a security label of the read area in response to specific characters in the read area.

16. The program according to claim 12, further comprising the step of changing a security label of the read area in response to one or both of a font size and a bleed degree of the read area.

* * * * *